United States Patent
Tenbrock et al.

(10) Patent No.: US 7,770,676 B2
(45) Date of Patent: Aug. 10, 2010

(54) METHOD FOR OPERATING A PARALLEL HYBRID POWERTRAIN OF A VEHICLE WITH AT LEAST ONE INTERNAL COMBUSTION ENGINE AND AT LEAST ONE ELECTRIC MOTOR

(75) Inventors: Friedrich Tenbrock, Langenargen (DE); Peter Schiele, Kressbronn (DE); Johannes Kaltenbach, Friedrichshafen (DE); Bernd Allgaier, Kressbronn (DE); Christian Schwemer, Friedrichshafen (DE); Michael Gromus, Tettnang (DE); Martin Neumann, Tettnang (DE); Klaus Habe, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 528 days.

(21) Appl. No.: 11/787,087

(22) Filed: Apr. 13, 2007

(65) Prior Publication Data
US 2007/0246273 A1    Oct. 25, 2007

(30) Foreign Application Priority Data
Apr. 19, 2006    (DE) .............. 10 2006 018 057

(51) Int. Cl.
*B60K 6/26* (2007.10)
(52) U.S. Cl. .......................... 180/65.285; 180/65.265; 180/65.275; 180/65.1; 903/930; 903/946
(58) Field of Classification Search ............. 180/65.21, 180/65.25, 65.265, 65.275, 65.285; 903/930, 903/946; 477/167, 168, 176
See application file for complete search history.

(56) References Cited

U.S. PATENT DOCUMENTS

| | | | | |
|---|---|---|---|---|
| 2,616,310 | A * | 11/1952 | Jandasek | 477/62 |
| 5,719,768 | A * | 2/1998 | Tashiro et al. | 701/67 |
| 5,779,595 | A * | 7/1998 | Kono et al. | 477/174 |
| 6,132,336 | A * | 10/2000 | Adachi et al. | 477/169 |
| 6,510,370 | B1 | 1/2003 | Suzuki et al. | |
| 6,565,483 | B2 * | 5/2003 | Segawa et al. | 477/174 |
| 6,785,598 | B2 | 8/2004 | Schiele | |
| 6,808,470 | B2 | 10/2004 | Boll | |
| 2002/0117339 | A1 | 8/2002 | Nakashima | |

(Continued)

FOREIGN PATENT DOCUMENTS

DE    195 49 081 A1    7/1997

(Continued)

*Primary Examiner*—Hau V Phan
*Assistant Examiner*—Bryan A Evans
(74) *Attorney, Agent, or Firm*—Davis & Bujold, P.L.L.C.

(57) ABSTRACT

A method for operating a parallel hybrid powertrain (1) of a vehicle having one internal combustion engine (2) and one electric motor (3). The electric motor is located in the drivetrain between an output and the internal combustion engine. Between the internal combustion engine and the electric motor, a frictionally engaged shifting element is provided, while between the electric motor and the output, a starting element (6) having a hydrodynamic torque converter (6A) and a converter lock-up clutch (6B) is disposed. A target output torque to be applied to the output is dependent on the slippage of the starting element. During a starting phase of the internal combustion engine via the electric motor, an input torque produced by the electric motor is directed at least in part via the torque converter and in part via the converter lock-up clutch.

20 Claims, 2 Drawing Sheets

U.S. PATENT DOCUMENTS

| | | |
|---|---|---|
| 2005/0153815 A1 | 7/2005 | Janssen |
| 2005/0155803 A1* | 7/2005 | Schiele .................. 180/65.2 |
| 2006/0266568 A1 | 11/2006 | Barske |

FOREIGN PATENT DOCUMENTS

| | | |
|---|---|---|
| DE | 100 26 332 A1 | 7/2001 |
| DE | 100 23 053 A1 | 12/2001 |
| DE | 100 65 760 A1 | 7/2002 |
| DE | 102 06 940 A1 | 2/2003 |
| DE | 101 58 536 A1 | 7/2003 |
| DE | 102 34 428 A1 | 2/2004 |
| DE | 103 27 306 A1 | 1/2005 |
| DE | 103 53 256 B3 | 3/2005 |
| DE | 10 2004 002 061 A1 | 8/2005 |
| DE | 10 2004 016 846 A1 | 10/2006 |
| JP | 2000-145046 A | 5/2000 |
| WO | WO-98/40647 | 9/1998 |

* cited by examiner

METHOD FOR OPERATING A PARALLEL HYBRID POWERTRAIN OF A VEHICLE WITH AT LEAST ONE INTERNAL COMBUSTION ENGINE AND AT LEAST ONE ELECTRIC MOTOR

This application claims priority from German Application Serial No. 10 2006 018 057.7 filed Apr. 19, 2006.

FIELD OF THE INVENTION

The invention relates to a method for operating a parallel hybrid powertrain of a vehicle comprising at least one internal combustion engine and at least one electric motor.

BACKGROUND OF THE INVENTION

Vehicles with parallel hybrid powertrains known from practical applications are typically constructed (between an internal combustion engine and the output of the vehicle) with a starting element, configured as a frictionally engaged clutch, in order to start the vehicle in the conventional manner using the internal combustion engine. The starting element during the starting process is initially operated with slip. When a vehicle of this type is additionally provided with a drive assembly configured as an electric motor, the controlled and regulated slip operation of the starting element is not required when starting the vehicle by using only the electric motor since electric motors, unlike conventional internal combustion engines, have no minimum rotational speed.

A method for controlling and regulating a powertrain of a hybrid vehicle and a powertrain of a hybrid vehicle having a frictional engagement starting clutch is known from DE 10 2004 002 061 A1. Using the method, according to the invention, for controlling and regulating a powertrain of a hybrid vehicle comprising an internal combustion engine, an electric motor, a shifting element disposed between the electric motor and an output in a power flow of the powertrain and designed with continuously variable transmission capacity, as well as a clutch device disposed between the electric motor and the internal combustion engine, via which clutch device the electric motor and the internal combustion engine can be operatively connected with each other, a powertrain of a hybrid vehicle can be operated such that a transition can be effected from driving the hybrid vehicle via the electric motor to a parallel operation of the hybrid vehicle via the electric motor and the internal combustion engine, or to only driving the hybrid vehicle via the internal combustion engine, as well as that a starting operation can be achieved of the internal combustion engine via the electric motor, without any reaction torque of the powertrain being noticeable to the driver of the hybrid vehicle.

For this purpose, during operation of the powertrain, the transmission capacity of the shifting element is adjusted during a starting phase of the internal combustion engine such that, at the output of the powertrain, the torque that is applied is independent from a starting phase of the internal combustion engine, wherein torque changes at the output, which occur due to the starting phase of the internal combustion engine, are preferably prevented by a slip operation of the shifting element.

With this method, during the starting phase of the internal combustion engine, the rotational speed of the electric motor is raised to a speed value at which it is guaranteed that the shifting element between the electric motor and the output of the powertrain is held in a slip operation during the entire starting phase of the internal combustion engine. The rotational speed value is computed by an algorithm implemented in the engine control and/or in the transmission control and/or in a higher-ranking torque manager.

In addition, powertrains of vehicles comprising internal combustion engines having minimum rotational speeds are known from practice, which for the implementation of a starting process of the vehicle via the internal combustion engine are provided with a hydrodynamic torque converter and a corresponding converter lock-up clutch, wherein the torque converter and the converter lock-up clutch are controlled and regulated in the conventional manner as a function of the operational state of the powertrain of the vehicle.

It is, therefore, the object of the invention to provide a method for operating a parallel hybrid powertrain of a vehicle. The powertrain having a starting element configured with a hydrodynamic torque converter and a corresponding converter lock-up clutch, the use of which element minimizes the influence of the torque converter on a target output torque to be applied on the output during a starting phase of the internal combustion engine via the electric motor.

SUMMARY OF THE INVENTION

According to the method of the invention for operating a parallel hybrid powertrain of a vehicle comprising at least one internal combustion engine and at least one electric motor. The electric motor is disposed in the drivetrain between an output and at least one internal combustion engine and a frictionally engaged shifting element is provided between the internal combustion engine and the electric motor, while between the electric motor and the output a starting element comprising a hydrodynamic torque converter and a converter lock-up clutch is provided. A target output torque to be applied to the output is dependent on the slippage of the starting element, the input torque produced by the electric motor is directed at least in part via the torque converter and in part via the converter lock-up clutch during a starting phase of the internal combustion engine via the electric motor.

By way of the method according to the invention, the influence of the hydrodynamic torque converter is reduced on the production of the required target output torque on the output of the vehicle during a starting phase of the internal combustion engine via the electric motor since the portion of the input torque of the electric motor directed via the torque converter can be adjusted to a value at which the torque fluctuations resulting from the starting phase of the internal combustion engine can be damped in the area of the converter lock-up clutch, in the part of the parallel hybrid powertrain on the combustion machine side in relation to the starting element.

In an advantageous variation of the method according to the invention, the converter lock-up clutch is maintained in a slip operation at least roughly during the entire starting phase of the internal combustion engine by a speed regulator of the electric motor, while the input torque generated by the electric motor is substantially directed toward the output via the converter lock-up clutch.

This way, the influence of the hydrodynamic torque converter can be minimized during a starting phase of the internal combustion engine via the electric motor, since the part of the driving torque of the electric motor directed via the torque converter is adjusted to a value at which the converter lock-up clutch is operating in a slip mode required for high driving comfort and torque fluctuations resulting from the starting phase of the internal combustion engine in the area of the converter lock-up clutch are still damped.

Furthermore, the part of the driving torque of the electric motor directed via the torque converter is preferably so low that due to the torque conversion between a pump wheel and a turbine wheel of the torque converter, no reaction torque noticeable for the driver and resulting in torque fluctuations can develop on the output.

In a further advantageous variant of the method according to the invention that is used to produce the target output torque to be applied at the output, a target input speed of the electric motor and a target transmission capacity of the converter lock-up clutch are determined as a function of a minimum rotational speed difference between an input speed and an output speed of the starting element. The difference depends on the operating mode parameters of the parallel hybrid powertrain, wherein the starting element is maintained at least roughly in a slip operation during the entire starting phase of the internal combustion engine by specifying the minimum speed difference, while the input torque produced by the electric motor is directed substantially toward the output via the converter lock-up clutch.

By defining the minimum speed difference, undesirable "engaging" of the converter lock-up clutch, meaning a synchronous operation of the converter lock-up clutch, is easily prevented, during which process damping of part of the parallel hybrid powertrain on the combustion machine side in relation to the starting element cannot be conduced in the desired scope during torque fluctuations occurring in the area of the converter lock-up clutch during a starting phase of the combustion machine via the electric motor.

BRIEF DESCRIPTION OF THE DRAWINGS

The invention will now be described, by way of example, with reference to the accompanying drawings in which.

DETAILED DESCRIPTION OF THE INVENTION

Figure 1:
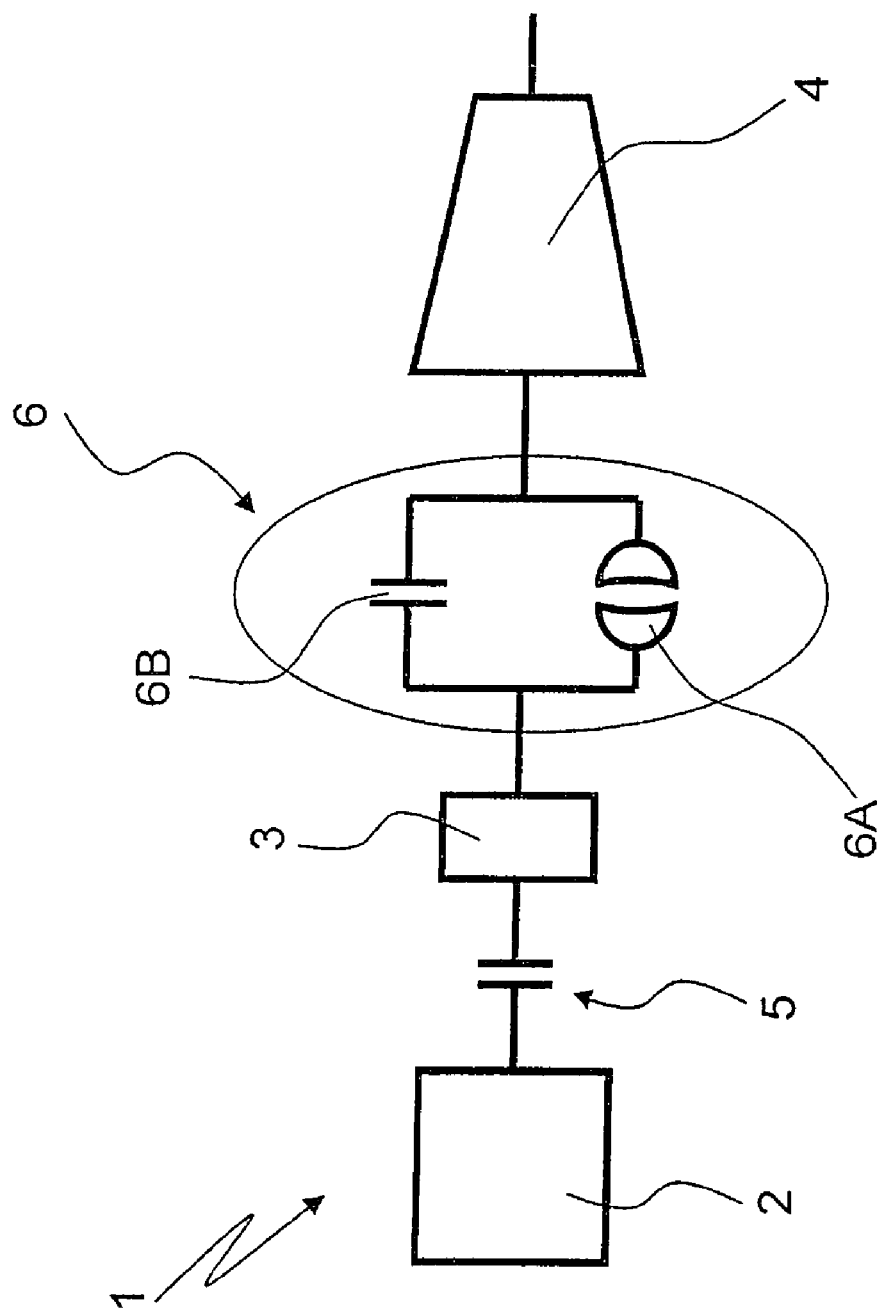
FIG. 1 is a highly schematic illustration of a parallel hybrid powertrain with a torque converter and a converter lock-up clutch disposed parallel to the former in the parallel hybrid powertrain.

FIG. 1 shows a parallel hybrid powertrain 1 of a vehicle in a highly schematic block diagram illustration. The parallel hybrid powertrain 1 comprises a internal combustion engine 2, an electric motor 3, a transmission 4 as well as a frictionally engaged shifting element 5 disposed between the internal combustion engine 2 and the electric motor 3, which element in the present example is configured as a frictionally engaged multi-disk clutch.

By way of the shifting element 5, an operative connection can be established between the internal combustion engine 2 and the electric motor 3 to be able to implement different operational states of the parallel hybrid powertrain 1 of the vehicle, such as drive solely via the electric motor 3, parallel drive via the internal combustion engine 2 and the electric motor 3 or drive solely via the internal combustion engine 2.

Furthermore, by disposing the shifting element 5 between the internal combustion engine 2 and the electric motor 3 it is possible to couple the internal combustion engine 2 to the electric motor 3 via the shifting element 5 such that the electric motor 3 starts the internal combustion engine 2, the coupling only being carried out when the rotatory energy of the electric motor 3 required for a starting process of the internal combustion engine 2 is available.

Furthermore, between the electric motor 3 and the transmission 4, which is disposed on the side of the electric motor 3 facing away from the internal combustion engine 2, a starting element 6 with continuously variable transmission capacity and comprising a torque converter 6A configured as a TRILOK converter and a converter lock-up clutch 6B disposed parallel to the former in the parallel hybrid powertrain 1 is provided, by way of which element the electric motor 3 is operatively connected to the transmission 4. In the present example, the transmission 4 is configured as a conventional automatic transmission, which allows the implementation of different gear ratios, wherein the transmission can be any transmission known from practice.

On the side facing away from the starting element 6 and/or on the transmission output side, the transmission 4 is operatively connected in a manner that is not shown in detail to the wheels of a vehicle driving axle of the parallel hybrid powertrain 1 by way of an axle differential.

Figure 2:
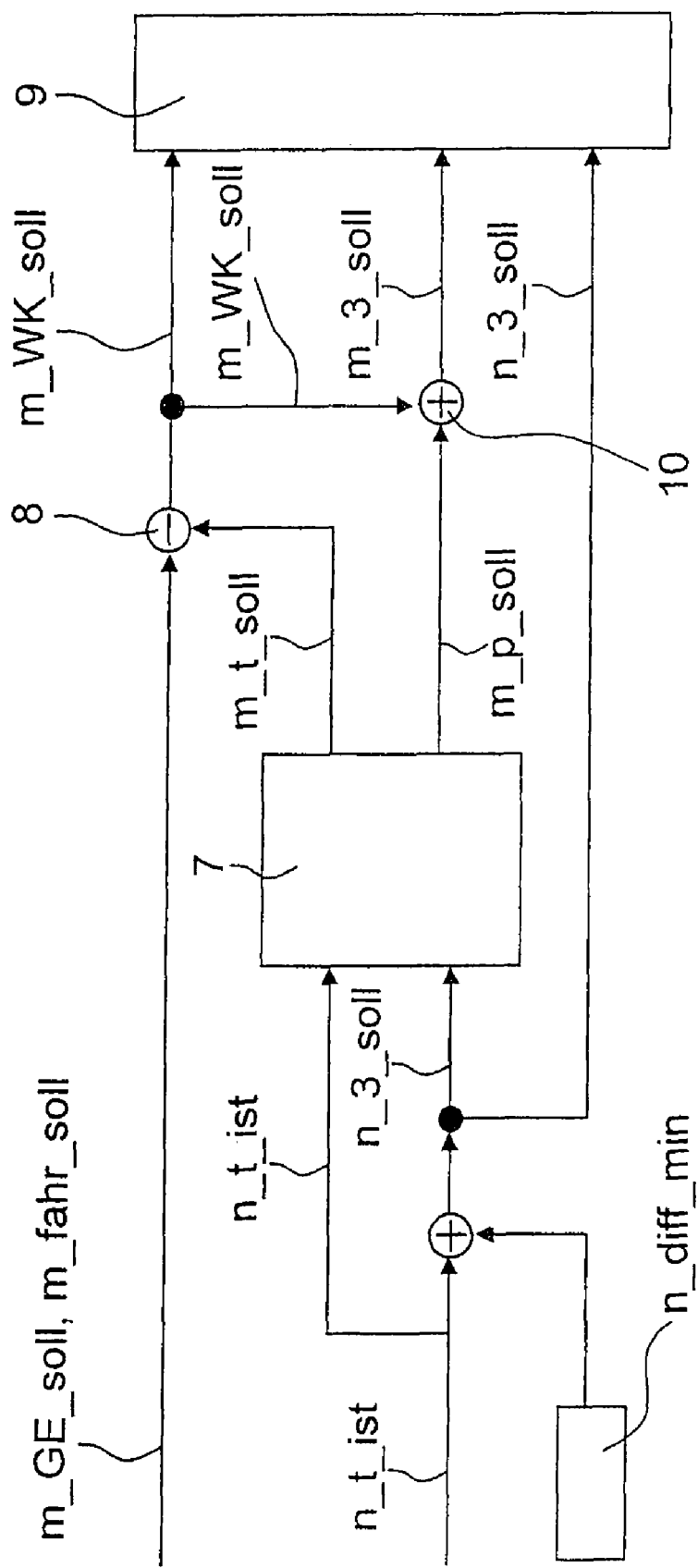
FIG. 2 is a block diagram of the method according to the invention, by way of which a target input torque and a target input speed of the electric motor as well as a target transmission capacity of the converter lock-up clutch of the parallel hybrid powertrain according to FIG. 1 can be defined during a starting phase of the internal combustion engine via the electric motor.

FIG. 2 shows the method according to the invention for adjusting a target output torque requested by the driver and/or a required transmission input torque m_GE_soll during a starting phase of the internal combustion engine 2 of the parallel hybrid powertrain 1 according to FIG. 1 in the form of a highly schematic block diagram. In addition to a measured actual turbine speed n_t_ist and a minimum speed difference n_diff_min between an input speed and an output speed of the starting element 6, which depends on the operational state parameters of the parallel hybrid powertrain, the target transmission input torque m_GE_soll requested by the driver, which is equivalent to a requested target output torque m_fahr_soll, provides an input variable for the routine determination of a target input torque m_3_soll to be produced by the electric motor 3, a target input speed n_3_soll of the electric motor 3 as well as a target transmission capacity m_WK_soll of the converter lock-up clutch 6B.

During this process, the starting element 6 is operated with slip by defining the minimum speed difference n_diff_min during a starting phase of the internal combustion engine 2 via the electric motor, and the input torque produced by the electric motor 3 during the starting phase is substantially directed via the converter lock-up clutch 6B toward the transmission 4 and/or the output of the parallel hybrid powertrain 1 disposed downstream of the transmission.

The measured actual turbine speed n_t_ist of the torque converter 6A and the minimum speed difference n_diff_min are then used to determine the target input speed n_3_soll of the electric motor 3, wherein the determined target input speed n_3_soll is supplied to a functional block 7 as an input variable in addition to the actual turbine speed n_t_ist of the torque converter 6A. Taking converter maps into consideration, a theoretical turbine torque m_t_theo and a theoretical pump torque m_p_theo of the torque converter 6A are computed in the functional block 7 as intermediate variables.

The theoretical turbine torque m_t_theo determined in the functional block 7 represents part of the requested target transmission input torque m_GE_soll and/or the requested target output torque m_fahr_soll. For this reason, in a node 8 the target transmission capacity m_WK_soll of the converter lock-up clutch 6B can be determined from the difference between the target transmission input torque m_GE_soll and the theoretical turbine torque m_t_theor and supplied to the real process 9 to be actuated, meaning the controller of the converter lock-up clutch 6B, as a target value definition.

At the same time, in a further node 10 the target transmission capacity m_WK_soll of the converter lock-up clutch 6B is added to the theoretical pump torque m_p_theo of the torque converter 6A computed in the functional block 7, wherein the sum represents a disturbance variable torque m_3_stoer for the control of the rotational speed of the electric motor 3.

From the computed target input speed n_3_soll of the electric motor 3 and a measured actual speed n_t_actual of the electric motor 3, a control deviation is determined, which is fed to a controller 11 configured as a proportional plus integral controller or PID controller, the output value of which represents a control portion m_3_adjust of a target input torque m_3_soll of the electric motor 3 to be determined.

In a node 12, the control portion m_3_adjust of the target input torque m_3_soll of the electric motor 3 is added to the disturbance variable torque m_3_stoer, which represents a control definition of the target input torque m_3_soll of the electric motor 3. The sum of the control definition m_3_stoer and the control portion m_3_adjust basically represents the target input torque m_3_soll to be produced by the electric motor 3 of the parallel hybrid powertrain 1 according to FIG. 1, which torque is required for producing the target output torque m_fahr_soll to be applied on the output 5.

The method described above divides the input torque of the electric motor 3 between the torque converter 6A and the converter lock-up clutch 6B in the area of the starting element 6 and part of the driving torque of the electric motor 3 is directed via the hydrodynamic clutch or the torque converter 6A and the other part of the driving torque of the electric motor 3 is directed via the slipping converter lock-up clutch 6B toward the transmission 4.

Depending on the definition of the minimum speed difference n_diff_min between the input speed and the output speed of the starting element 6, which difference can be adjusted by regulating the rotational speed of the electric motor 3, it is easily possible to direct the majority of the input torque of the electric motor 3 via the converter lock-up clutch 6B toward the input of the transmission 4 and to dampen torque fluctuations in the area of the slipping starting element 6 caused by the connection of the internal combustion engine 2 in the part of the parallel hybrid powertrain 1 on the internal combustion engine side in relation to the starting element 6, without causing any changes of the output torque m_GE_soll present on the transmission input or of the output torque present on the output when starting the internal combustion engine 2.

This specification is implemented even better the lower the portion of the input torque of the electric motor 3 that is directed toward the transmission 4 via the torque converter 6A is, since, unlike in the case of the slipping converter lock-up clutch 6B, rotational speed disturbances occurring in the parallel hybrid powertrain during the starting phase of the internal combustion engine 2 negatively affect the course of the output torque of a vehicle due to the hydrodynamic behavior of the torque converter 6A and impair the driving comfort.

This method takes advantage of the knowledge that the torque which can, in principle, be directed via a torque converter, decreases as the speed difference decreases and increases as the speed difference increases, following a characteristic converter curve.

In principle, the definition of the minimum speed difference between the input speed and the output speed of the starting element 6 should be such that as a result of the target value definition for the target input speed n_3_soll of the electric motor 3, the values that are fed during the entire starting phase of the internal combustion engine are such that a minimum speed difference or a target slippage is exceeded in the area of the torque converter to reliably prevent accidental closing of the converter lock-up clutch, meaning a synchronous or slip-free operation of the converter lock-up clutch, during rotational speed disturbances in the parallel hybrid powertrain.

In addition, it is also possible to take the vibration and humming behavior of the starting element 6 and the parallel hybrid powertrain 1 into consideration when defining the minimum speed difference n_diff_min of the starting element 6, in order to achieve maximum driving comfort.

In principle, the minimum speed difference n_diff_min represents a variable that is determined during the application as a function of the requested target output torque m_fahr_soll and the actual turbine speed n_t_ist of the torque converter 6A, wherein of course it is up to the discretion of the person skilled in the art to determine the minimum speed difference n_diff_min as a function of the respective application based on a characteristic curve computed as a function of the output torque present on the output and/or the turbine rotational speed of the torque converter or based on performance data that is determined as a function of both variables.

Ideally, when the internal combustion engine 2 is turned off, meaning the vehicle with the parallel hybrid powertrain 1, according to FIG. 1, is driven solely via the electric motor, the shifting element 5 is completely disengaged, so that the electric motor 3 does not have to drag the rotating masses of the internal combustion engine 2. If a driving strategy is associated with a request to connect the internal combustion engine 2, with the shifting element 5 having a transmission capacity at which substantially no torque can be directed via the shifting element 5, the transmission capacity of the shifting element 5 is adjusted to the value required for connecting the internal combustion engine 2.

As the transmission capacity of the shifting element 5 increases, the shut-off internal combustion engine 2 is increasingly driven by the electric motor 3, wherein the resulting drag torque counteracting the input torque of the electric motor 3 represents a disturbance variable for controlling the target input speed n_3_soll of the electric motor 3.

During the starting phase, the internal combustion engine 2 is controlled by way of a target input torque curve or a target input rotational speed curve, allowing easy support of a transition of the shifting element 5 into a synchronous operating mode when the internal combustion engine 2 is connected. In addition, when the internal combustion engine 2 is connected and the shifting element 5 assumes the synchronous operating mode, meaning basically at the end of the starting phase of the internal combustion engine 2, the transmission capacity of the shifting element 5 is adjusted to a value at which a torque that is present on the shifting element 5 is transmitted at least without slip when the input speed of the electric motor 3 is greater than or equal to the idle speed of the internal combustion engine 2.

In the event that the input speed and/or the target input speed n_3_soll of the electric motor is less than the idle speed of the internal combustion engine, the transmission capacity of the shifting element 5, after the starting phase, is adjusted to a value at which the shifting element 5 transitions into a slip operation and the internal combustion engine is operated without disturbance at the level of the idle speed, meaning without stalling the internal combustion engine 2.

In the event that the operating mode of the parallel hybrid powertrain 1 is such that a theoretical turbine torque m_t_theo is determined as a function of the actual turbine speed n_t_ist and the minimum speed difference n_diff_min, which torque is greater than the transmission input torque m_GE_soll requested by the driver, a suitable creep function is activated and the internal combustion engine 2 is started via the electric motor 3, while the converter lock-up clutch 6B is completely disengaged. This enables starting the internal combustion engine 2 also while the vehicle is sitting still, wherein the vehicle, due to the activated creep function, will at least start to roll as a function of the input torque of the electric motor and the characteristic converter curve when the vehicle brake is not applied.

If rolling of the vehicle through the use of a higher-ranking driving strategy or actuation of the brake pedal or a parking brake is not desired and a start-up of the internal combustion engine 2 is requested, for example due to a low charge state of an electric accumulator associated with the parallel hybrid powertrain 1 and/or the electric motor 3, the power flow of the parallel hybrid powertrain 1 between the electric motor 3 and the output of the vehicle in the area of the transmission 4, which is not shown in detail, is reduced or completely interrupted such that, for example, by switching a frictionally engaged clutch into slip operation or by completely opening a shifting element of the transmission 4, the output torque present on the output during the starting phase of the internal combustion engine 2 is substantially zero.

In principle, during a starting phase of the internal combustion engine, the method according to the invention described above is used to maximize the portion of the input torque of the electric motor, which is supposed to be directed via the converter lock-up clutch in order to minimize the portion of the input torque of the electric motor, which is directed via the torque converter of the starting element disposed between the electric motor and the transmission, thus minimizing the influence of the characteristic converter curve on the target output torque to be applied on the output.

As a result, the procedure according to the invention represents a method for regulating the pump rotational speed of the hydrodynamic torque converter, with the aid of the converter lock-up clutch, wherein the turbine torque of the hydrodynamic torque converter is adjusted as a function of the speed difference on the torque converter.

REFERENCE NUMERALS 1 parallel hybrid powertrain
2 internal combustion engine
3 electric motor
4 transmission
5 frictionally engaged shifting element
6 starting element
6A torque converter
6B converter lock-up clutch
7 functional block
8 node
9 real process
10 node
11 controller
12 node
n_diff_min minimum speed difference
m_GE_soll target transmission input torque
n_t_ist actual turbine speed
n_3_soll target input speed of the electric motor
m_fahr_soll target input torque
m_p_theo theoretical pump torque of the torque converter
m_t_theo theoretical turbine torque of the torque converter
m_WK_soll target transmission capacity of the converter lock-up clutch
m_3_soll target input torque of the electric motor
m_3_adjust control variable of the input torque of the electric motor
m_3_stoer disturbance torque

The invention claimed is:

1. A method for operating a parallel hybrid powertrain (1) of a vehicle to minimize torque fluctuations in an output of the powertrain caused by starting a combustion engine, the parallel hybrid powertrain comprising at least one internal combustion engine (2) and at least one electric motor (3), the electric motor (3) being located in the powertrain between the internal combustion engine (2) and the output of the powertrain (1), a frictionally engaged shifting element (5) being located between the internal combustion engine (2) and the electric motor (3), a starting element (6), comprising a hydrodynamic torque converter (6A) and a converter lock-up clutch (6B), being located between the electric motor (3) and the output, and a target output torque (m_fahr_soll) directed to the output being dependent on slippage of the starting element (6), the method comprising the steps of:

generating an input torque with the electric motor (3); and
directing an amount of the input torque to the combustion engine (2) for starting the internal combustion engine (2);
during a starting phase in which the electric motor (3) starts the internal combustion engine (2);
directing at least a first portion of the input torque to the torque converter (6A);
directing at least a second portion of the input torque to the converter lock-up clutch (6B); and
regulating slippage of the starting element (6) depending on a target input speed (n_3_soll) of the electric motor (3) and a target transmission capacity (m_WK_soll) of the converter lock-up clutch (6B).

2. The method according to claim 1, further comprising the step of maintaining the converter lock-up clutch (6B) in a slip operation substantially at least an entire starting phase of the internal combustion engine (2) by a speed regulator of the electric motor (3), while directing the input torque generated by the electric motor (3) substantially toward the output via the converter lock-up clutch (6B).

3. A method for operating a parallel hybrid powertrain (1) of a vehicle with at least one internal combustion engine (2) and at least one electric motor (3), the electric motor (3) being located in the powertrain between the internal combustion engine (2) and an output of the powertrain (1), a frictionally engaged shifting element (5) being located between the internal combustion engine (2) and the electric motor (3), a starting element (6), comprising a hydrodynamic torque converter (6A) and a converter lock-up clutch (6B), being located between the electric motor (3) and the output, and a target output torque (m_fahr_soll) directed to the output being dependent on slippage of the starting element (6), the method comprising the steps of:

generating an input torque with the electric motor (3); and
during a starting phase in which the electric motor (3) starts the internal combustion engine (2);
directing at least a first portion of the input torque to the torque converter (6A); and
directing at least a second portion of the input torque to the converter lock-up clutch (6B); and
determining a target input speed (n_3_soll) of the electric motor (3) and a target transmission capacity (m_WK_soll) of the converter lock-up clutch (6B), as a function of a minimum speed difference (n_diff_min) between an input speed and an output speed of the starting element (6), with the minimum speed difference (n_diff_min) depending on operational state parameters of the parallel hybrid powertrain (1), for producing the target output torque (m_fahr_soll) directed to the output.

4. The method according to claim 3, further comprising the step of defining the minimum speed difference (n_diff_min) to maintain the slip operation of the starting element (6) at least substantially during an entire starting phase of the internal combustion engine (2), while the input torque, produced by the electric motor (3), is substantially directed toward the output via the converter lock-up clutch (6B).

5. The method according to claim 3, further comprising the step of using the minimum speed difference (n_diff_min) to represent a variable one of determined during the application as a function of the requested target output torque (m_fahr_soll) and based on a characteristic curve computed as a function of the output torque.

6. The method according to claim 3, further comprising the step of using the minimum speed difference (n_diff_min) to represent a variable one of determined during the application as a function of the actual turbine speed (n_t_ist) and based on a characteristic curve computed as a function of the turbine speed of the torque converter.

7. The method according to claim 3, further comprising the step of determining a target input speed (n_3_soll) of the electric motor (3) as a function of an actual turbine speed (n_t_ist) of the torque converter (6A) and the minimum speed difference (n_diff_min).

8. The method according to claim 7, further comprising the step of a determining a theoretical turbine torque (m_t_theo) of the torque converter (6A) as a function of the actual turbine speed (n_t_ist) of the torque converter (6A) and the target input speed (n_3_soll) of the electric motor (3), while taking into consideration converter maps of the torque converter (6A).

9. The method according to claim 8, further comprising the step of the determining a target transmission capacity (m_WK_soll) of the converter lock-up clutch (6B) from a difference between the theoretical turbine torque (m_t_theo) of the torque converter (6A) and the requested target output torque (m_fahr_soll).

10. The method according to claim 7, further comprising the step of determining a theoretical pump torque (m_p_theo) of the torque converter (6A), as a function of the actual turbine speed (n_t_ist) of the torque converter (6A), and the target input speed (n_3_soll) of the electric motor (3), while taking into consideration converter maps of the torque converter (6A).

11. The method according to claim 10, further comprising the step of computing a disturbance variable torque (m_3_stoer) influencing the speed control of the electric motor (3) from a sum of the target transmission capacity (m_WK_soll) of the converter lock-up clutch (6B) and the theoretical pump torque (m_p_theo) of the torque converter (6A), with the disturbance variable torque (m_3_stoer) representing a control portion of a target input torque (m_3_soll) of the electric motor (3).

12. The method according to claim 3, further comprising the step of determining a control deviation from the actual rotational speed (n_t_ist) of the electric motor (3) and the target rotational speed (n_3_soll) of the electric motor (3).

13. The method according to claim 12, further comprising the step of feeding the control deviation of the input speed of the electric motor (3) as an input value to a controller (11), and the output value of which represents the control portion of the target input torque (m_3_soll) of the electric motor (3).

14. The method according to claim 13, further comprising the step of defining the target input torque (m_3_soll) of the electric motor (3) as a sum of the disturbance variable torque (m_3_stoer) and the control portion (m_3_adjust).

15. The method according to claim 1, further comprising the step of substantially producing the target output torque (m_fahr_soll) with the electric motor (3) when one or more of the shifting element (5), disposed between the electric motor (3) and the internal combustion engine (2), has a transmission capacity at which substantially no torque is directed via the shifting element (5), and the internal combustion engine (2) is shut off, and connecting the internal combustion engine (2) to the parallel hybrid powertrain (1) when requested to produce an input torque, via the internal combustion engine, by varying the transmission capacity of the shifting element (5).

16. The method according to claim 1, further comprising the step of adjusting the transmission capacity of the shifting element (5) to the value required for connecting the internal combustion engine (2), increasingly shut-off internal combustion engine (2) by the electric motor (3) as the transmission capacity of the shifting element (5) increases, and counteracting the input torque of the electric motor (3) representing a disturbance variable for determining the target input speed (n_3_soll) of the electric motor (3) with the resulting drag torque, when a connection to the internal combustion engine (2) has been requested.

17. The method according to claim 1, further comprising the step of controlling the internal combustion engine (2), during the starting phase, by one of a target input torque curve and a target input speed curve, and switching the shifting element (5) to a synchronous state while the internal combustion engine (2) is connected.

18. The method according to claim 17, further comprising the step of, when the internal combustion engine (2) is connected and the shifting element (5) is in a synchronous operating mode, adjusting the transmission capacity of the shifting element (5) to a value at which torque present on the shifting element (5) is transmitted substantially slip-free.

19. The method according to claim 1, further comprising the step of, following the starting phase of the internal combustion engine (2) when the target input speed (n_3_soll) of the electric motor (3) is smaller than an idle speed of the internal combustion engine (2), adjusting the transmission capacity of the shifting element (5) to a value at which the shifting element (5) switches to a slip operation and the internal combustion engine (2) operates without disturbance at the idle speed.

20. The method according to claim 1, further comprising the step of at least reducing the power flow of the parallel hybrid powertrain (1), between the electric motor (3) and the output of the vehicle in the area of the transmission (4), by at least one of:
  switching a frictionally engaged clutch of the transmission (4) into a slip condition;
  completely disengaging a shifting element of the transmission (4) such that the output torque, present on the output during the starting phase of the internal combustion engine (2), is substantially zero, when by way of one or more of a higher-ranking driving strategy;
  actuating one of the brake pedal and a parking brake to stop vehicle movement and
  starting the internal combustion engine (2) to electrically charge an electric accumulator associated with the electric motor (3).

* * * * *